Oct. 28, 1924.
M. L. CAUMONT
COVER FASTENER
Filed March 10, 1924
1,513,581
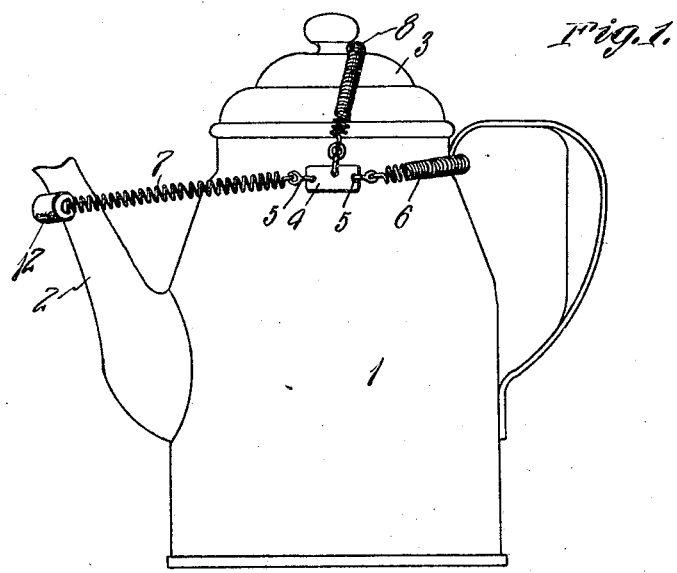
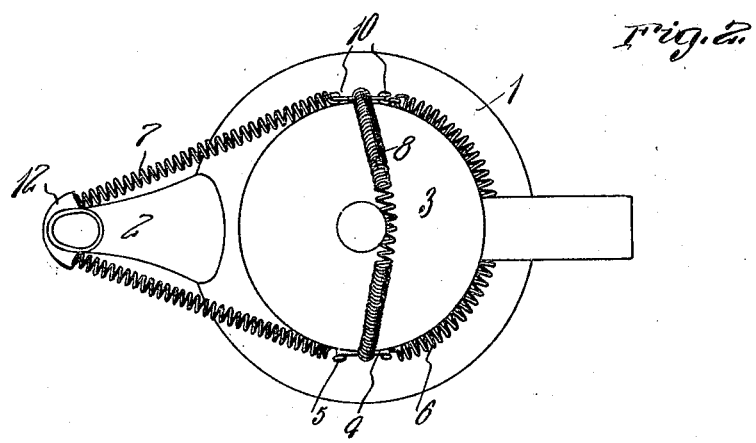
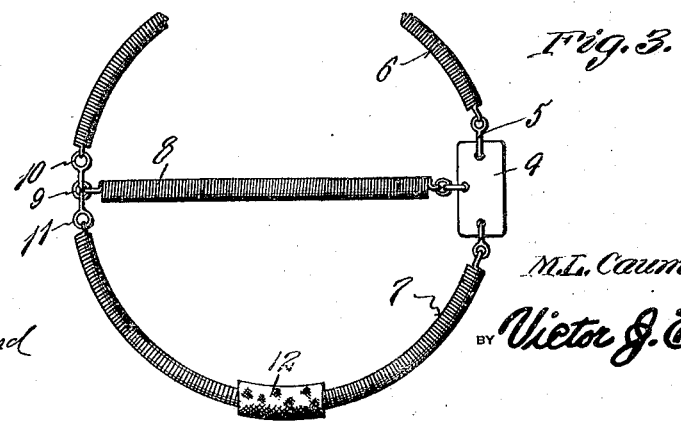

Patented Oct. 28, 1924.

1,513,581

UNITED STATES PATENT OFFICE.

MARCEL LUCINE CAUMONT, OF BROOKLYN, NEW YORK.

COVER FASTENER.

Application filed March 10, 1924. Serial No. 698,331.

*To all whom it may concern:*

Be it known that I, MARCEL LUCINE CAUMONT, a citizen of the United States, residing at Brooklyn, in the county of Kings and State of New York, have invented new and useful Improvements in Cover Fasteners, of which the following is a specification.

In pouring tea or coffee into cups, the pot or percolator is necessarily tilted to an angle. In returning the same to vertical position a part of the coffee will almost invariably drop from the spout away from the cup, and consequently the table covering is soiled. In addition to this the lids of such pots frequently open during the pouring operation so that a large quantity of the beverage is thus lost and dropping on to a table covering stains and injures the same.

It is the object of this invention to produce a means for catching the drippings from a coffee or tea pot after the beverage has been poured therefrom and to likewise securely hold the cover thereof in closed position.

With the above broadly stated objects in view, the invention resides in the construction, combination and operative association of parts such as is disclosed by the drawings which accompany and which form part of this application.

In the drawings:—

Figure 1 is a view illustrating the application of the improvement.

Figure 2 is a top plan view thereof.

Figure 3 is a plan view of the improvement detached.

In Figures 1 and 2 of the drawings, the numeral 1 designates a coffee or tea pot or percolator, the spout of which being indicated by the numeral 2 and the cover by the numeral 3.

In carrying out my invention, I make use of a metal plate 4 having apertures adjacent to its end and having a central aperture adjacent to one of its edges. Through all of these apertures there are passed hooks, of the same construction, and generally indicated by the numeral 5. To each of these hooks there is attached one end of a coiled spring. The rear coiled spring is indicated by the numeral 6, the forward coiled spring by the numeral 7 and the top coiled spring by the numeral 8. The spring 8 has its free end provided with an eye 9, and the springs 6 and 7 have their free ends provided with hooks 10 and 11 to engage the eye 9 when the device is attached, as disclosed in Figures 1 and 2.

On the spring 7 there is slidably arranged a roll of fabric or other absorbent material, indicated by the numeral 12. The roll is designed to be arranged directly below the mouth of the spout 2 of the pot 1 when the device is positioned on the pot, the spring 6 being arranged around the rear of the pot and beneath the handle thereof, while the spring 8 is positioned directly over the top or lid 3 of the pot. In the application of the improvement, the springs are connected together by the hooks 10 and 11 of the springs 6 and 7 engaging in the eye 9 of the spring 8 and the hooks 5 may be permanently attached to the plate 4.

While I have referred to the resilient elements 6, 7 and 8 as coiled springs, it is obvious that other resilient or elastic elements may be employed. By arranging the roll of absorbent fabric 12 directly beneath the mouth of the spout 2, it will be apparent that any dripping from the spout, when the latter is turned from angular to vertical position, will drop thereon and be absorbed therein so that liability of such drippings inflicting injury to a table covering will be prevented. It will be further apparent that the spring or elastic element 8 disposed over the top or cover 3 will prevent the accidental opening thereof. The improvement is of an extremely simple construction and may be cheaply manufactured and marketed.

The roll 12 of absorbent fabric may be replaced when desired, as it is simply necessary to roll upon itself a strip of any fabric suitable for my purpose and stitch or otherwise secure the outer end to the body thereof.

Having described the invention, I claim:

In combination with a tea or coffee pot having a spout and a lid, of a means for clamping the lid on the pot and for absorbing the drippings from the spout, comprising a plate, spring members secured to the ends and to the top of the plate, the outer spring member secured to the ends of the plate designed to be arranged respectively around the neck and around the spout of the pot, and the central spring designed to be arranged over the lid of the pot, an eye on the free end of the last mentioned spring, hooks on the ends of the first mentioned springs to engage the eye, and a roll of absorbent material removably arranged on the spring disposed around the spout of the pot and designed to be forced by said spring against said spout, for the purpose set forth.

In testimony whereof I affix my signature.

MARCEL LUCINE CAUMONT.